US006243762B1

(12) United States Patent
Greene et al.

(10) Patent No.: US 6,243,762 B1
(45) Date of Patent: Jun. 5, 2001

(54) METHODS AND APPARATUS FOR DATA ACCESS AND PROGRAM GENERATION ON A MULTIPROCESSING COMPUTER

(75) Inventors: Jonathan E. Greene, Great Barrington; James Gogolinski, Webster, both of MA (US)

(73) Assignee: Mercury Computer Systems, Inc., Chelmsford, MA (US)

( * ) Notice: Subject to any disclaimer, the term of this patent is extended or adjusted under 35 U.S.C. 154(b) by 0 days.

(21) Appl. No.: 08/287,540

(22) Filed: Aug. 8, 1994

(51) Int. Cl.[7] .................................................. G06F 15/00
(52) U.S. Cl. ........................... 709/310; 709/106; 709/107
(58) Field of Search .................................. 395/700, 650, 395/100; 709/310, 312, 330, 106, 107, 400, 208, 245, 217; 711/148

(56) References Cited

U.S. PATENT DOCUMENTS

| | | | | |
|---|---|---|---|---|
| 4,821,194 | * | 4/1989 | Clancy et al. | 364/200 |
| 4,910,668 | * | 3/1990 | Okamoto et al. | 711/207 |
| 5,349,656 | * | 9/1994 | Kameko et al. | 395/671 |
| 5,349,682 | * | 9/1994 | Rosenberry | 395/800 |
| 5,479,656 | * | 12/1995 | Rawlings . | |
| 5,485,579 | * | 1/1996 | Hitz et al. . | |
| 5,485,606 | * | 1/1996 | Midgdey et al. . | |
| 5,491,359 | * | 2/1996 | May et al. | 257/373 |
| 5,495,606 | * | 2/1996 | Borden et al. | 707/3 |
| 5,581,765 | * | 12/1996 | Munroe et al. | 395/677 |
| 5,592,625 | * | 1/1997 | Sandberg | 711/202 |
| 5,710,923 | * | 1/1998 | Jennings et al. | 395/680 |

OTHER PUBLICATIONS

At the Core: An API Comparison, Morris, Robert, Brooks, Williams PC Tech Journal, vol. 6, No. 12, p62 (12), rec. 1988.*

UNIX Programming Network, W Richard Stevens, Prentice Hall Software Series, 1990.*

The Design of the UNIX Sysem, Maurice Bach, Prentice Hall, 1986.*

S. Sakai, et al, "Reduced Interprocessor–Communication Architecture for Supporting Programming Models", IEEE, pp. 134–143, Sep. 1993.*

* cited by examiner

*Primary Examiner*—Majid A. Banankhah
*Assistant Examiner*—Sue Lao
(74) *Attorney, Agent, or Firm*—David J. Powsner; Nutter, McClennen & Fish LLP

(57) ABSTRACT

The invention provides improvements to multiprocessing systems of the type having a plurality of processes, each with an associated memory, and mechanisms that permit each process to access storage locations in the memory of other processes by specifying addresses (or other such indicators) associated with those locations. The improvement is characterized, according to one aspect of the invention, by an allocation element that allocates data buffers with portions encompassing data storage locations in one or more of the process memories. A mapping element generates addresses from storage location expressions that are made in terms of (i) the id.'s of processes in whose memories those locations reside, and (ii) offsets from a unique pointer—referred to as a pas_ptr—associated with each data buffer. Other improvements pertain to execution of parallel processes using such data buffering mechanisms, as well as use of semaphores and synchronization flags on multiprocessing systems.

27 Claims, 7 Drawing Sheets

METHODS AND APPARATUS FOR DATA ACCESS AND PROGRAM GENERATION ON A MULTIPROCESSING COMPUTER

BACKGROUND OF THE INVENTION

The invention relates to digital data processing and, more particularly, to the execution of parallel tasks on multiprocessing systems.

Developers of multiprocessing computer systems have found it desirable to create parallel processing software tools by redesigning existing uniprocess applications. This typically involves supplementing those existing applications by adding software that partitions input data for access across multiple processors, releases that data to the processors, and gathers up the results, e.g., for display to the operator.

Although this has a tremendous appeal, it is evident that only those applications with high computation-to-I/O ratios benefit from such a simplistic approach. Moreover, as the number of processors performing an application increases, the marginal benefit of adding one more processor decreases. This is because partitioning and collection time stays the same, or increases due to additional overhead, while the per-processor processing time decreases due to greater concurrency.

An objective of the present invention is, therefore, to provide improved methods and apparatus for execution of parallel tasks on multiprocessing systems.

More particularly, an objective is to provide a high-performance, flexible, scalable and easy-to-use systems for implementing and/or executing programs for parallel execution on such systems.

A related object is to provide an improved method of interprocess access of data on multiprocessing systems.

SUMMARY OF THE INVENTION

The invention provides improvements on multiprocessing systems that have a plurality of processes, each with an associated memory, and mechanisms that permit each process to access storage locations in the memory of other processes by specifying addresses (or other such indicators) associated with those locations.

The improvement is characterized, according to one aspect of the invention, by an allocation element that allocates data buffers with portions encompassing data storage locations in one or more of the process memories. A mapping element generates addresses from storage location expressions that are made in terms of (i) the id.'s of processes in whose memories those locations reside, and (ii) offsets from a unique pointer—referred to as a pas_ptr—associated with each data buffer.

By way of example, the mapping element can generate an address for a memory location "10, pas_ptr+4," where "10" is the process id., and "pas$_{ptr+}$4" refers to a location four words from the start of the corresponding data buffer portion in the memory of that process. The processes rely on the mapping element to determine addresses that can be applied to the system's data access mechanisms and, thereby, provide access to specific memory locations.

According to other aspects of the invention, a process can generate a request for creation of a distributed buffer. The allocation element responds by allocating a multi-part buffer having portions distributed among memories corresponding to a specified set of processes. The portions can be the same length, encompassing the same number of data storage locations in their respective memories. Those portions can reside at a common offset from the start of designated "heap" regions within the memories. The value of that offset can be reflected, for example, in the pas_ptr of the data buffer.

According to other aspects of the invention, a process can generate a request creation of an assembled buffer, causing the allocation element to allocate a unitary buffer on the memory of a single, specified process.

Multiple processes can generate tagged requests for allocation of a single buffer. For example, where processes #1, #3, #4 and #10 require access to a common buffer—distributed or assembled—each can generate a tagged request. The allocation element responds to the first such request by creating the buffer and returning to the first requester a pas_ptr. It responds to subsequent requests, simply, by returning the same pas_ptr, thereby, affording those processes access to the same distributed or assembled data buffer.

Other aspects of the invention provide still further improvements on multiprocessing systems that have a plurality of processes, each with an associated memory element, and mechanisms that permit each process to access storage locations in the memories of another process by specifying addresses (or other such indicators) associated with those locations. The improvements in this regard include providing a data buffer of the type described above, having one or more portions distributed among the process memories.

Further, a master process transmits to one or more slave processes a signal identifying a function or procedure that the slaves are to execute. That signal can be, for example, an index to a common table of pointers to function/procedure instructions. In addition, the master process transmits a signal identifying in a data buffer storage location to be used in executing the function/procedure, e.g., a pass-by-reference "argument." The master process specifies that argument as an process id./pas_ptr expression, as described above.

The slave processes, which include mapping elements that generate addresses from process id./pas_ptr expressions, execute the requested function/procedure and access the relevant storage locations by supplying those addresses to the multiprocessing system's data access mechanisms.

According to a related aspect of the invention, the master process can supply to the slave processes multiple arguments.

According to other aspects of the invention, the master process can itself create (or spawn) the slave processes through operating system functionality provided by the multiprocessing system. Once created, each slave process can enter a wait state pending notification (e.g., via a semaphore) from the master of a command to invoke a function/procedure.

In still other aspects, the invention provides an improved digital data processor of the type having multiple functional units, e.g., multiple processes. The improvement is characterized by inclusion, in at least a selected functional unit, of a set of buffers (or scalars) that store status information, or flags, received from the other functional units. A flag-wait element associated with the selected functional unit monitors one or more of those buffers and generates a signal indicating whether values stored therein meet a specified condition (e.g., they are greater then, less then, or equal to a specified value). Where the condition is not met, the element can enter a wait state, according to one aspect of the invention.

According to other aspects of the invention, the selected functional unit can include a buffer for storing status information that unit generates itself, as well as still more sets of buffers for storing other status information from the other functional units.

In yet another aspect, the invention provides methods of generating computer programs for execution on multiprocessing systems. The method is characterized by the step of identifying in a first sequence of instructions—e.g., a user-generated computer program—selected function/procedure calls. Those calls can be identified, for example, by linking an object version of the program and noting function/procedures listed as having unidentified references.

The method further calls for generating, e.g., via an automated process, a second sequence of instructions that define the selected function/procedure. The function/procedure is generated to include instructions that (i) generate an index identifying a corresponding function/procedure to be executed by one or more slave processes, and (ii) invoke a driver sequence of instructions for transferring, to one or more slave processes, that index and arguments for use in executing that corresponding function/procedure.

According to the method, the first, second and driver sequences are executed on a master process, while a so-called third sequence of instructions in executed on the slave processes. That third sequence of instructions invokes the corresponding function/procedure using the arguments passed by the master process.

According to a further aspect of the invention, one or more data buffers are allocated during execution of the first sequence of instructions. That buffer is of the type described above, having one or more portions distributed among the process memories and being represented by a pas_ptr. An argument, generated in connection with the selected function/procedure call, indicates a storage location in the data buffer for use in executing the function/procedure. That argument is expressed as an id./pas_ptr pair, which is used during execution of the third sequence of instructions to determine a virtual address of the corresponding location. That address, in turn, can be applied in invoking the corresponding function/procedure on the slave processes.

According to still other aspects of the invention, the method calls for generating a data table having entries for each of one or more selected function/procedures for which an undefined reference is identified during linking of the first sequence of instructions. That data table, which can be generated in source-code format, includes entries that include pointers to corresponding function/procedures, as well as the number and type (e.g., pass-by-reference vs. pass-by-value) of arguments required by each.

Correspondingly, the second sequence of instructions can include instructions for generating, as the index, a pointer to an entry in the table corresponding to the function/procedure to be executed.

These and other aspects of the invention, including further methods and apparatus paralleling those described above, are evident in the drawings and in the detailed description that follow.

BRIEF DESCRIPTION OF THE DRAWINGS

A further appreciation of the invention may be attained by reference to the drawings, in which.

DETAILED DESCRIPTION OF THE ILLUSTRATED EMBODIMENT

Figure 1:
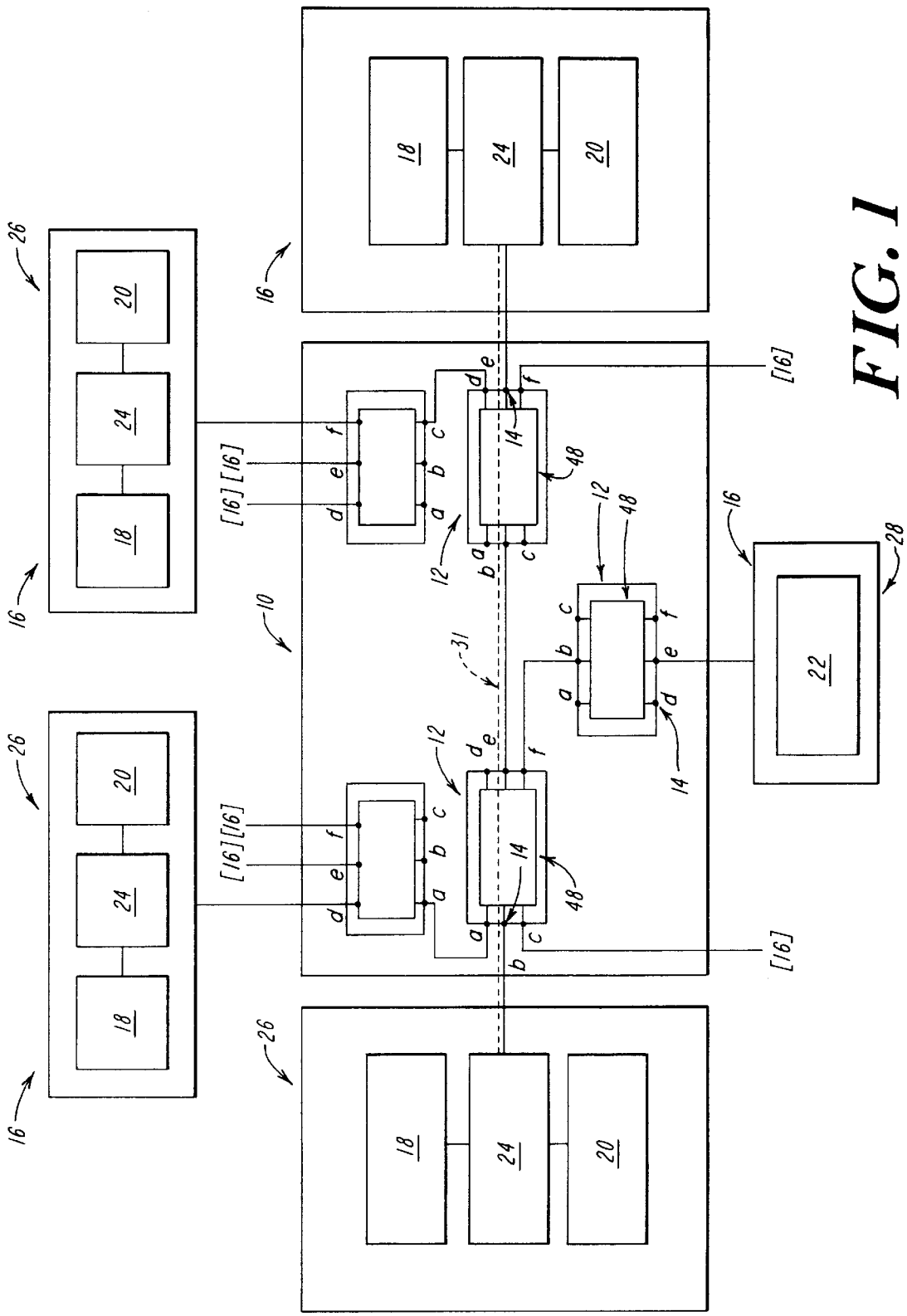
FIGS. 1 and 2 depict an exemplary multicomputer system 5 providing an environment for practice of the invention.

FIG. 1 depicts an exemplary multicomputer system 5 providing an environment for practice of the invention. That system comprises a plurality of processors, each with an associated memory and each capable of executing one or more processes. The system also includes mechanisms that permit each process to access storage locations in the memory of other processes by specifying virtual addresses (or other such indicators) associated with those locations. Those skilled in the art will readily appreciate that the multiprocessor system of FIG. 1 is illustrated by way of example only and that other multiprocessing systems may be used to practice the invention as well.

The system 5 is based on a communication network providing a configurable multicomputer architecture. The communication network, or crossbar network 10, is made up of a number of interconnected crossbars 12, multi-port communications devices in which one or more communication paths can be established between pairs of ports 14. Connected to the ports 14 of the crossbar network 10 are computer nodes 16, functional modules that contain some or all of the following computer resources: processors 18, memory 20, and interface (I/O) logic 22.

A processing node 26 is intended to execute user-loadable programs. Such a node typically consists of a processor 18, its local memory 20, and other supporting hardware devices (DMA engine, timers, etc.). A processing node can also contain one or more communications interfaces. A processing node must also contain an interface 24 to the crossbar network.

Figure 2:
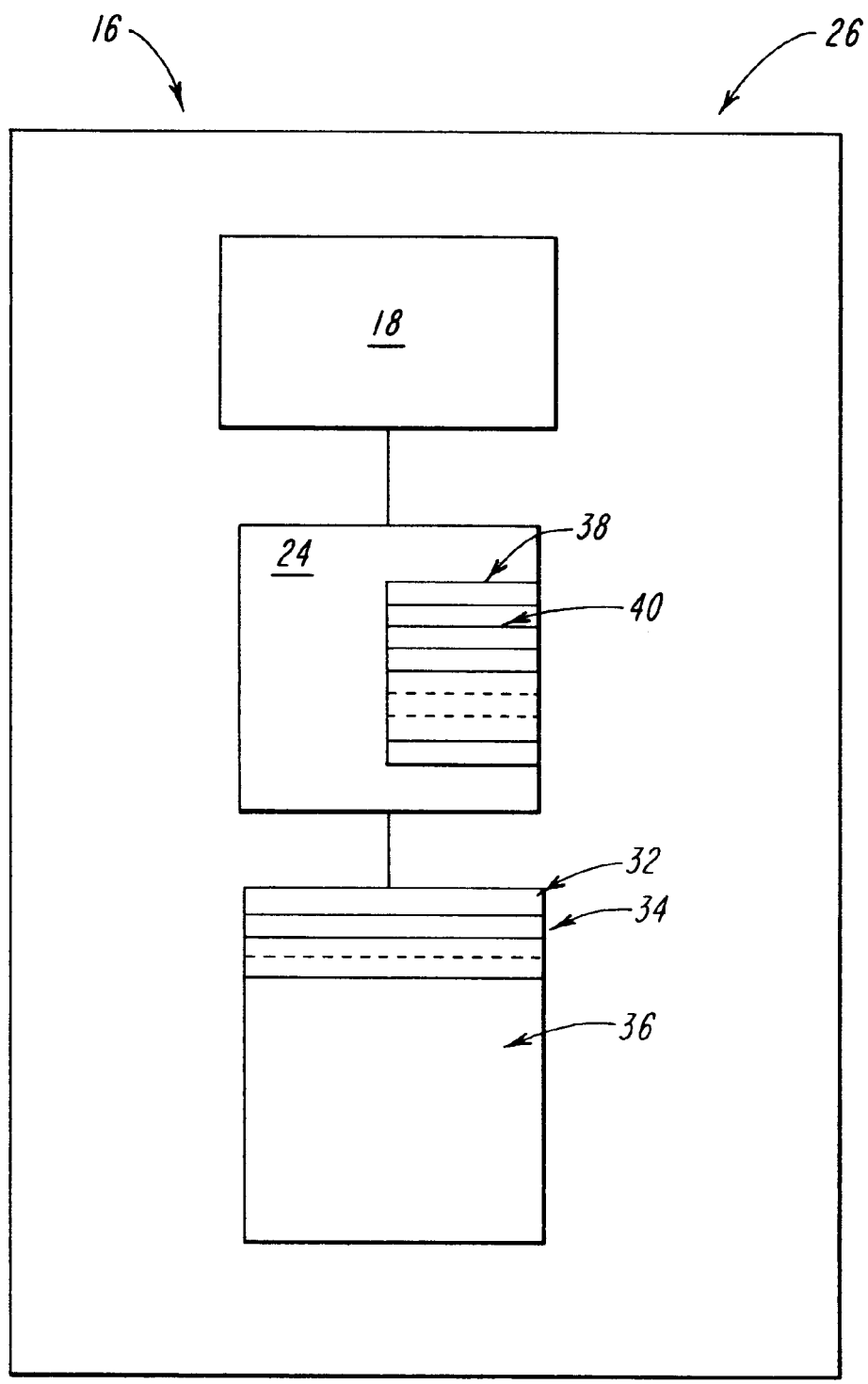

As seen in FIG. 2, each node 16 can be viewed as having local address-space 32 containing registers 34 and memory 36 in specific locations. The communication link, or path, through the crossbar network 10 provides a means for mapping a remote node's address space into a local node's address space, for direct access between the local node 16 and remote memory.

A processing node 26 (or computing environment, or "CE") contains an interface 24 with the crossbar network 10, which in a preferred embodiment takes the form of logic circuitry 38 embedded in an application specific integrated circuit, or CE ASIC. This crossbar interface logic circuit 38 converts some digital signals generated by the processor 18 into digital signals for the crossbar network 10. This allows a node processor 16, for example, to access resources, such as memory, in remote nodes 16, through normal processor reads and writes. The logic circuitry 38 also acts as a path arbiter and as a data-routing switch within the processing node 26, allowing both the local processor 18 and external masters to access node resources such as memory 36 and control registers. When an external master needs to use a node's resources, the logic circuitry 38 switches access to them from the local processor 18 to the external master.

In particular, the crossbar interface 38 provides routing registers 40 so that a node processor 18 can, in effect, map a portion of an external processor's memory into the node's local memory. In the preferred embodiment, each processor node 26 is provided by the crossbar interface registers 40 with thirteen "external memory pages", that is, the ability to simultaneously map up to thirteen segments of memory from remote slave node memories. In a preferred embodiment, for example, each external memory page is approximately 256 Mbytes long, so that a node can use up to approximately 3.25 Gbytes of remote slave address space. Each external memory page can be programmed to access a different external resource, or several pages can be programmed to access one slave's address space.

To communicate with resources in remote nodes, a local node programs one of its routing registers 40, and then transfers data to and from an address in the external memory page controlled by the register 40. The address in the external memory page corresponds to an address in memory of a remote node, accessed through the crossbar network 10 by way of the communication path (e.g., path 31) designated by the routing fields 46 of the routing registers 40. Once a processor 18 has programmed a routing register 40, the processor 18 can access the remote node's memory by simply reading and writing locations within the external memory page. The local processor's read or write address serves as an offset into the remote node's local address space.

A more complete understanding of the system 5 may be attained by reference to co-pending, commonly assigned U.S. patent application Ser. No. 213,982, filed Mar. 15, 1994 for Method And Apparatus For Monitoring And Controlling Multiprocessor Digital Data Processing Systems (now U.S. Pat. No. 5,602,729, the teachings of which are incorporated herein by reference.

Processor nodes 26 are preferably of the type commercially available from the assignee hereof for use in connection with a RACEWAY computer system. Such nodes typically operate in connection with the MC/OS™ operating system, which is also available from the assignee hereof. Those skilled in the art will appreciate that other known multiprocessing systems, running other known operating systems, in general accord with the foregoing can be used to provide an environment in which the invention is practiced.

Figure 3:
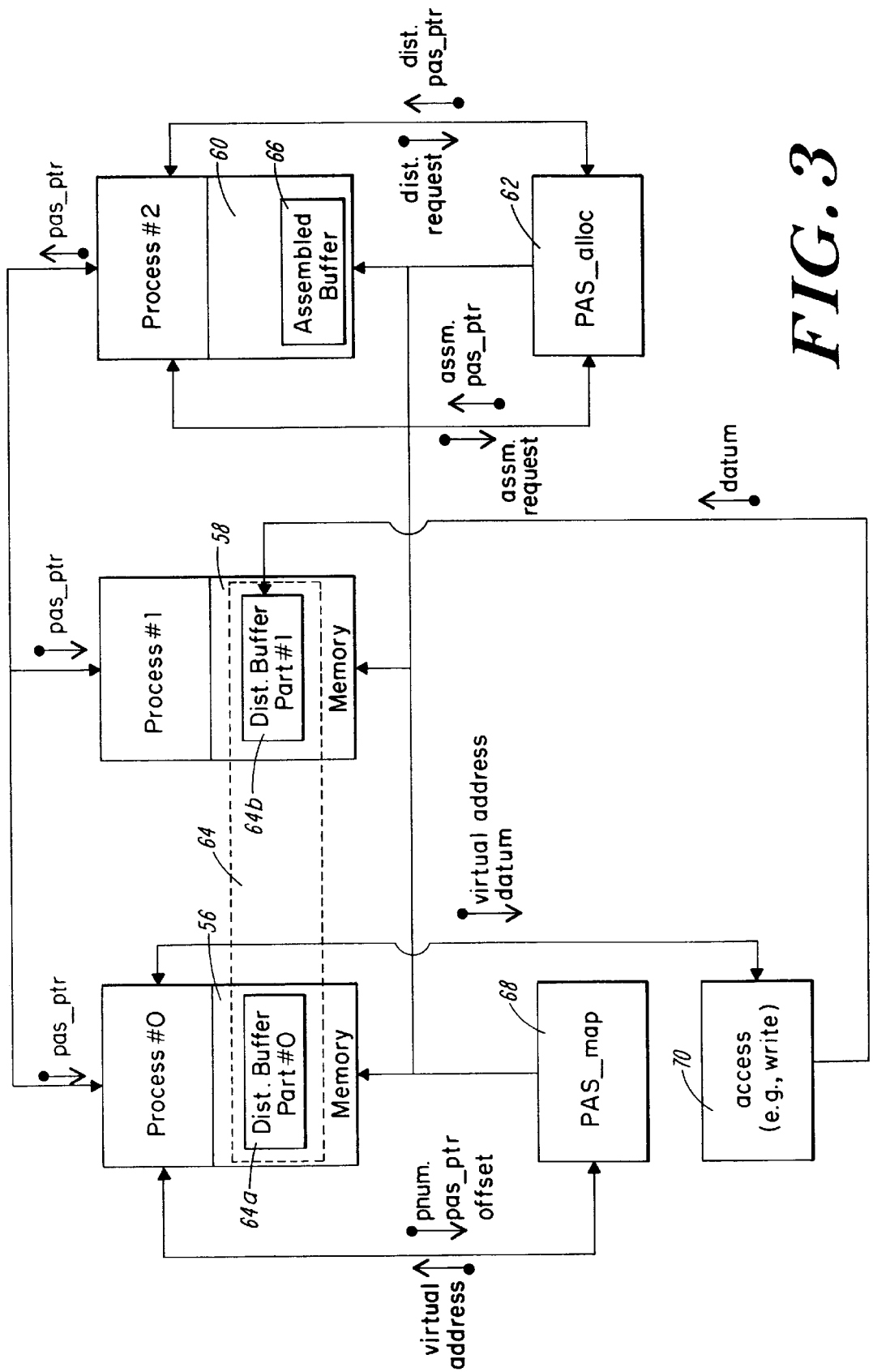
FIG. 3 depicts an embodiment of the invention in which data buffers are allocated and accessed on an interprocess basis.

FIG. 3 depicts a multiprocessing system according to the invention having mechanisms for interprocess creation and access to data buffers. Referring to the drawing, a plurality of processes—here, by way of example, PROCESS #0, PROCESS #1, PROCESS #2—execute on processing nodes 26 and, more particularly, on respective processors 18, of system 5. Each process preferably executes on its own respective processor 18, though, multiple processes can execute on a single processor. Each process has an associated memory 56, 58, 60, as illustrated, corresponding to memory elements 20 of FIG. 1.

Allocation element 62 is invoked by any of the processes, e.g., PROCESS #2, to allocate data buffers 64, 66, each having portions that encompass data storage locations in one or more of process memories 56–60. Element 62 returns to the invoking process a unique pointer—referred to as a pas_ptr—by which the data buffer and its respective portion (s) may be referenced.

In accord with a specific request from PROCESS #2, element 62 can create a distributed data buffer 64 having portions 64a, 64b encompassing data storage locations in multiple memories 56, 58, respectively. Multiple processes PROCESS #0, PROCESS #1, PROCESS #2 can generate so-called tagged allocation requests, causing element 62 to create a single buffer (in response to the first such request) and to return the pas_ptr of that same buffer for all other such requests.

Portions of a distributed data buffer are typically the same length, i.e., they encompass the same number of data storage locations in their respective memories. Those portions can reside at a common offset from the start of designated "heap" regions (not shown) within the memories. That offset can be reflected, for example, in the value of the pas_ptr associated with the data buffer.

In accord with a specific request from PROCESS #2, element 62 can also create an aggregate data buffer 66 having a single portion encompassing data storage locations in a single memory 60.

Allocation element 62 can be embodied in special purpose hardware or, preferably, in software executing on any of the processing nodes 26 of system 5. Still more preferably, element 62 is embodied as a system software tool operating within the process (e.g., PROCESS #2) that invokes it.

A mapping element 68, which can also be invoked by any of the processes, e.g., PROCESS #0, generates addresses from storage locations expressed in terms of (i) the id.'s of processes in whose memories those locations reside, and (ii) offsets from a unique pointer associated with each data buffer. For example, if PROCESS #0 wishes to access a memory location offset four words from the start of the data buffer portion 64b, it sends to mapping element 68 an expression in the form "1, pas_ptr+4," where "1" refers to the process id. of PROCESS #1 and "pas_ptr+4" refers to the desired offset location in portion 64b.

Once an address corresponding to a remote memory location of interest is obtained from mapping element 68, a process (e.g., PROCESS #0) invokes data access routines and mechanisms 70 supplied with system 5 (and its attendant operating system) to read or write data at the location designated by that address.

As above, mapping element 68 can be embodied in special purpose hardware or, preferably, in software executing on any of the processing nodes 26 of system 5. Still more preferably, element 68 is embodied as a system software tool operating within the process (e.g., PROCESS #0) that invoked it.

A further appreciation of the structure and operation of the above-described mechanisms for creation and access to data buffers may be attained by reference to Appendix A, e.g., in the section entitled "Parallel Heaps, I-heaps and P-heaps," "pas_open( )," "pas_alloc( )," and "pas_map( )."

Figure 4:
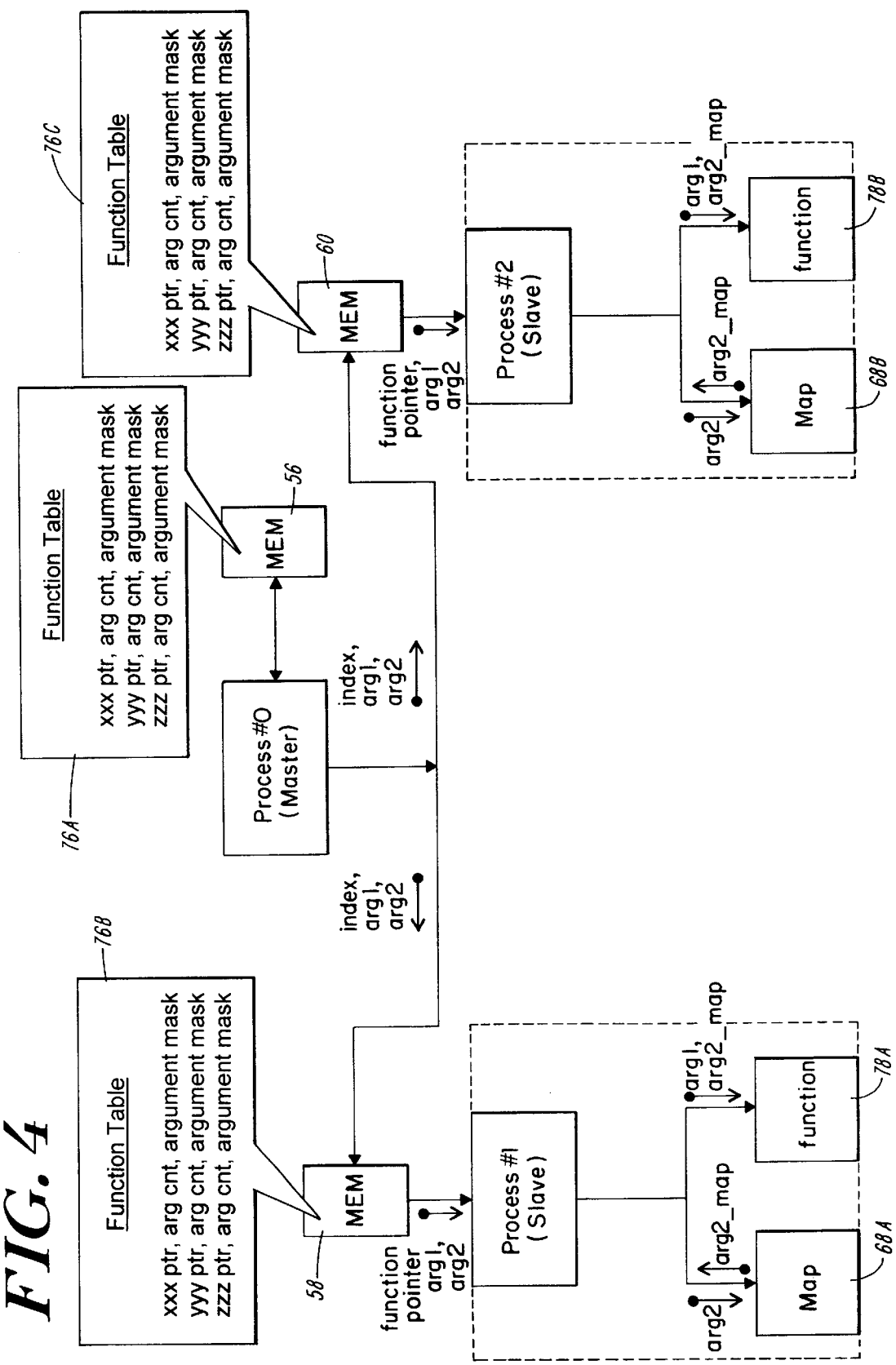
FIGS. 4 and 5 depict an embodiment of the invention in which a plurality of processes work in a master/slave relationship to execute a task in parallel, sharing data via a buffering scheme of the type discussed above.

FIG. 4 depicts a multiprocessing system according to the invention in which a plurality of processes work in a master/slave relationship to execute a task in parallel, sharing data via a buffering scheme of the type discussed above. In the drawing, master PROCESS #0 transmits to a slave processes PROCESS #1 and PROCESS #2, a signal referred to as index identifying a function or procedure that the slaves are to execute. In addition, the master PROCESS #0 transmits one or more arguments signal arg1, arg2, at least one of which (arg2) identifies a data buffer storage location to be used in executing the function/procedure. The master process expresses that argument as a process-id./pas_ptr-offset, as described above.

While the signal index can comprise the name of the function/procedure to execute, it preferably constitutes an index to a table of pointers to such function/procedures. That table 76A, 76B and 76C, which is common to the processes PROCESS #0, PROCESS #1, PROCESS #2, additionally includes information regarding arguments required by the function/procedure. That information includes a count of the number of arguments required (or accepted) by the function/procedure, as well as a mask indicating which arguments are expressed as process-id/pas_ptr-offset pairs (which—as opposed to pass-by-value parameters—require conversion via the mapping element).

Illustrated slave processes PROCESS #1, PROCESS #2 include mapping elements 68A, 68B, like element 68 of FIG. 3, that generate a virtual address for each process-id./pas_ptr-offset argument supplied to the function/procedure. Thus, in the drawing map element 68A, 68B converts the argument signals arg2 supplied to each of the respective slave processes PROCESS #1, PROCESS #2 into a corresponding virtual address signal arg2_map. Such mapped arguments are supplied (along with any unmapped arguments, i.e., pass-by-value parameters) to the requested function/procedure 78A, 78B which, in turn, supplies the corresponding addresses to the multiprocessing system's data access mechanisms (element 70, FIG. 1).

Function/procedure elements 78A, 78B can be embodied in special purpose hardware or, preferably, in software executing on any of the processing nodes 26 of system 5. Still more preferable, function/procedure elements 78A, 78B are embodied in software operating on the invoking slave process (e.g., PROCESS #1 or PROCESS #1).

Figure 5:
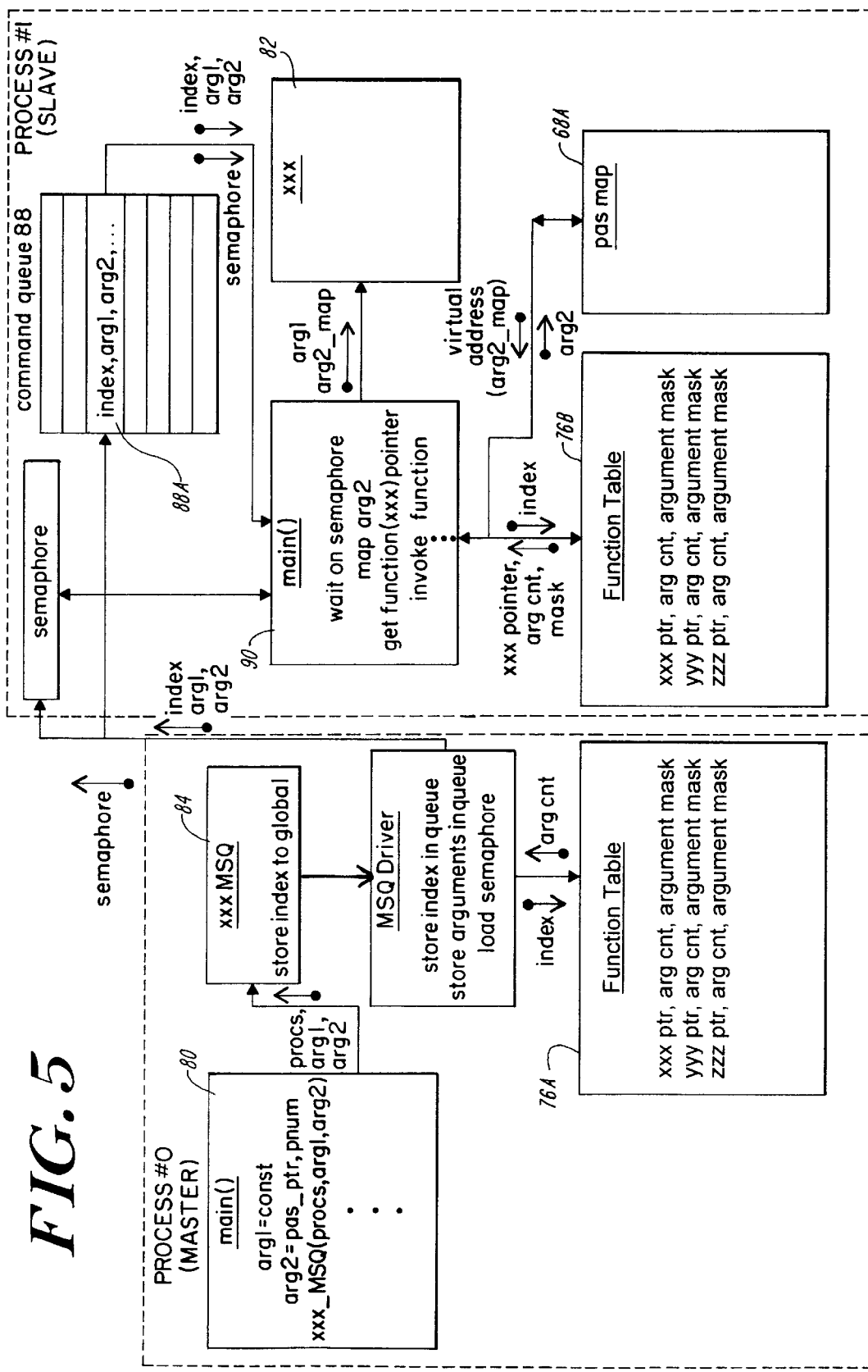

FIG. 5 depicts is still greater detail a multiprocessing system according to the invention in which a plurality of process work in a master/slave relationship to execute a task in parallel, sharing data via a buffering scheme of the type discussed above. Though elements shown in the drawing can be implemented in special purpose hardware, they are preferably implemented in software; hence, the discussion that follow utilizes software terminology.

In the drawing, a main routine 80 operating on PROCESS #0 executes a sequence of steps that assign values to arguments arg1, arg2 for use in execution of a routine xxx (element 82) operating on one or more slave processes, e.g., PROCESS #1. By way of example, routine 80 sets arg1 to a constant value and arg2 as process-id./pas_ptr-offset expression identifying a storage location in a buffer portion (e.g., element 64b, FIG. 1) into which results of routine xxx are to be placed. Further, routine 80 invokes procedure xxx_MSQ with arg1, arg2 and a designator procs indicating which slave processes are to be used in executing procedure xxx—in the drawing, only one such slave process, i.e., PROCESS #1 is shown.

Upon invocation, master process procedure xxx_MSQ (element 84) stores a designated index to a global value accessible, e.g., to procedure MSQ_Driver (element 86). That index, which points to an entry in function table 76A, corresponding to procedure xxx, will serve as an identification of that procedure in subsequent processing, as evident in the discussion below.

Procedure xxx_MSQ then invokes (or otherwise branches) to procedure MSQ_Driver which stores the index to an entry 88A in a command queue 88 of PROCESS #1 and each other slave process (not shown) specified by the argument procs. MSQ_Driver also stores to that entry the arguments arg1, arg2 that had been passed to xxx_MSQ by routine 80. For this purpose, MSQ_Driver relies on the arg cnt portion of the corresponding entry in function table 76A to determine the number of arguments required by procedure xxx. Those skilled in the art will appreciate, in this regard, that such use of arg cnt facilitates declaration of xxx_MSQ itself (and procedures like it) without regard to the actual number of arguments by its corresponding routine xxx—and, thereby, facilitates automated generation of xxx_MSQ itself (and procedures like it) as discussed below.

Once it has stored the index and arguments to command queue 88 (and equivalent queues in other designated slave processes), procedure xxx_MSQ signals the slave processes, e.g., via a semaphore, as illustrated.

Slave PROCESS #1 is spawned by master PROCESSES #0, e.g., prior to invocation of xxx_MSQ, using procedure pas_open, discussed below. Upon spawning, a main routine 90 on the slave process enters a wait state pending receipt of a semaphore in designated memory location 92. Once that semaphore is received, routine 90 retrieves from command queue 88 function indexes and arguments stored there by the master PROCESS #0.

Based on the index portion of each such queued entry, routine 90 retrieves from function table 76B a pointer to the function to be called (xxx), a count of arguments for that function, arg cnt, and an argument mask indicating which arguments are in process-id./pas_ptr-offset format. Based on the latter, routine 90 invokes mapping element 68A to determine the virtual address, arg2_map, of the corresponding storage location. Typically, the process id in the process-id/pas_ptr-offset pair designates the local process. This is in fact the default if an id is not explicity supplied to xxx_MSQ.

Using the pointer obtained from table 76B, routine 90 invokes the designated function 82 with the converted virtual address arguments, as well as the other arguments supplied to the slave PROCESS #1.

A further appreciation of the structure and operation of the above-described mechanisms for execution of tasks in parallel and sharing of data may be attained by reference to Appendix A, e.g., in the sections entitled "Getting Started" and "func_MSQ( )."

Those skilled in the art will readily appreciate that the interrelationship of elements shown in FIG. 5 lends itself to automated generation of the instruction sequences comprising at least element 84 and, thereby, for readily invoking the function/procedure 82 on any number of slave processes.

Specifically, prior to runtime, the instructions making up routine 80 are scanned to identify selected function/procedure calls (e.g., routine xxx_MSQ) having counterparts (e.g., routine xxx) amenable to execution on the slave processes. This is preferably done by linking an object-code version routine 80 to identify function/procedures having a specific name component, such as "xxx_MSQ" listed by a conventional linker/loader (and, preferably, a linker/loader commercially available from the assignee hereof with the MC/OS™ operating system) as "unidentified references."

For each such unidentified function/procedure, a sequence of instructions is automatically generated defining that function/procedure. Each such sequence includes instructions that (i) generate the global index referred to above (e.g., in connection with discussion of element 84) identifying the corresponding function/procedure to be executed by the slave processes, and (ii) invoke driver sequence, MSQ_Driver, as discussed above.

Those skilled in the art will appreciate, in view of the discussion herein, that a master process can invoke itself as a "slave" using the described procedures and mechanisms. In this context the master specifyies its own process number (e.g., 0) for execution of the designated function/procedure.

Source code defining function tables 76A–76C are made concurrently with generation of such procedures. As noted, those tables include entries containing inter alia pointers to the function/procedures to be executed on the slave process (e.g., routine 82), as well as the argument counts and masks for those procedures. Those skilled in the art will appreciate that, by identifying the function/procedures to be executed (e.g., xxx) by name in that source code, the task of assigning pointers to them is beneficially relegated to a conventional linker/loader.

A further appreciation of the automated generation of code in a preferred embodiment of the invention may be attained by reference to Appendix A, e.g., in the sections entitled "Building a PAS Application (PBT Tool)."

Figure 6:
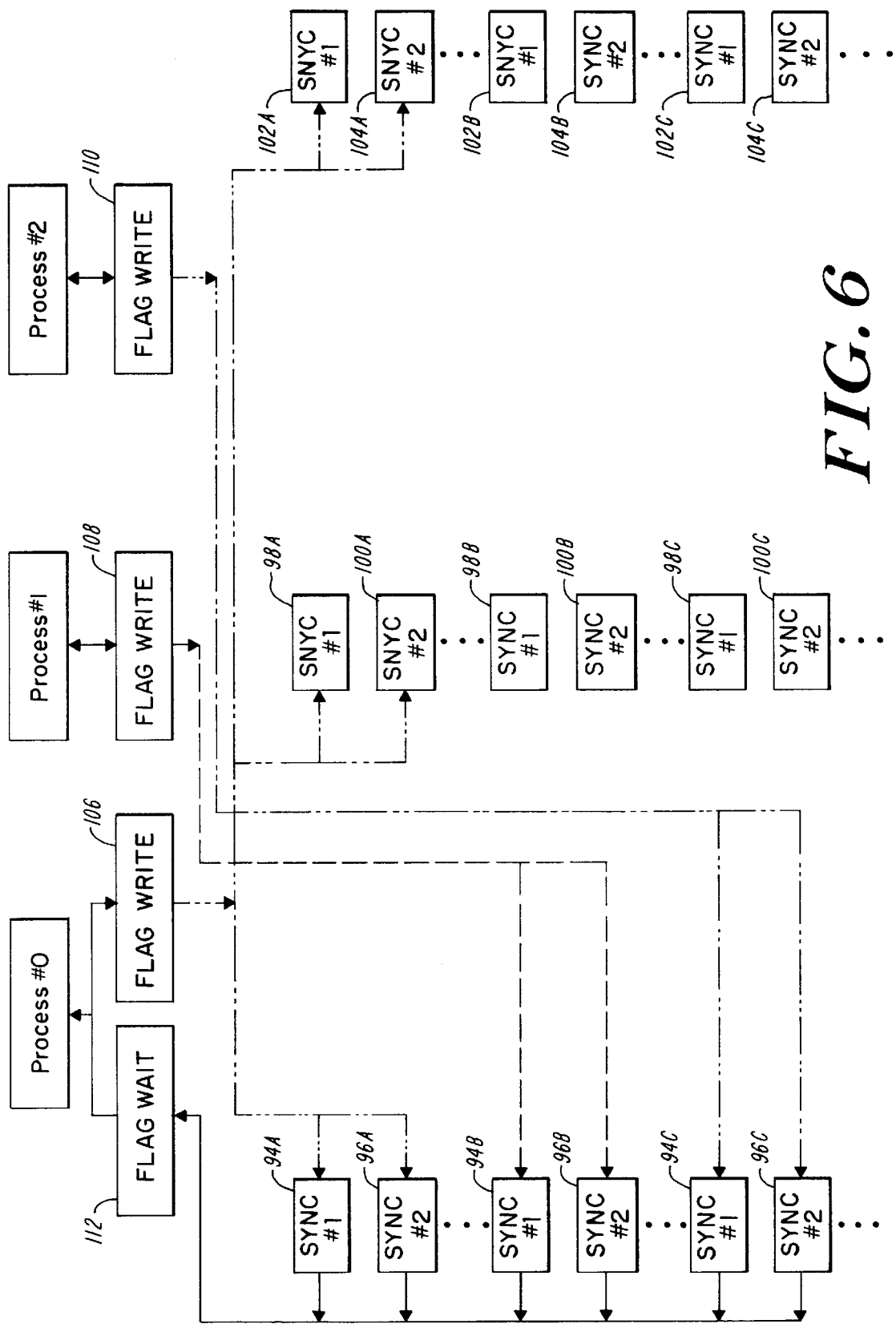
FIGS. 6 and 7 depict synchronization flag and semaphore-handling mechanisms used in a digital data processor according to the invention.

FIG. 6 depicts a multiprocessing system with improved synchronization flag storage and handling mechanisms according to the invention. The system includes PROCESS #0, PROCESS #1 and PROCESS #2, as above, each associated with two sets of sync flag buffers. Thus, PROCESS #0 is associated with buffer sets 94 (comprising buffers 94A–94C) and 96 (comprising buffers 96A–96C); PROCESS #1 with buffer sets 98 (comprising buffers 98A–98C) and 100 (comprising buffers 100A–100C); and PROCESS #2 with buffer sets 102 (comprising buffers 102A–102C) and 104 (comprising buffers) 104A–104C.

Each buffer set 94–104 comprises one buffer associated with each process in the system. Thus, within buffer set 94, buffer 94A is associated with PROCESS #0; buffer 94B, with PROCESS #1; and buffer 94C with PROCESS #2. Likewise, within buffer set 96, buffer 96A is associated with PROCESS #0; buffer 96B, with PROCESS #1; and buffer 96C with PROCESS #2. Although the illustration shows only two sets for each process, it will be appreciated that many more such buffer sets can well be incorporated in view of the teachings herein.

The processes are coupled with a buffer-writing element that transmits status information to each of the associated buffers. Thus, PROCESS #0 includes sync FLAG WRITE element 106 that transmits status information to buffers 94A and 96A, as well as to the corresponding buffers in sets 98–104 (as indicated by dashed communications lines emanating from element 106). PROCESS #1 and PROCESS #2 likewise include sync FLAG WRITE elements 108, 110, respectively, for driving status information to their associated buffers, as shown.

Each process is also coupled to a buffer reading element that receives status information stored with its buffer sets. Thus, PROCESS #0 includes sync FLAG WAIT element 112 that reads status information from each of the buffers in sets 94 and 96. Likewise, PROCESS #1 and PROCESS #2 include sync FLAG WAIT elements (not shown) for reading status information from their associated sets 98,100 and 102, 104, respectively.

In the illustrated embodiment, buffers 94A–104C are each capable of storing eight bytes of synchronization information, although only the lower four bytes are used. Status information driven by sync FLAG WRITE elements 106–110 into those buffers can include, for example, integer values or status bits.

Correspondingly, the sync FLAG WAIT elements 112, etc., respond to selective invocation by their corresponding processes to monitor designated buffers in the respective sets. Thus, at the request of PROCESS #0, sync FLAG WAIT element 112 monitors values in one or more of the buffers in sets 94 and 96. As discussed further below, the sync FLAG WAIT elements can return a Boolean value indicating whether the value in a designated buffer fulfills a designated logical expression (e.g., is the value less than 5?). Alternatively, the sync FLAG WAIT elements can suspend until the value in a buffer actually fulfills that expression.

As above, the sync FLAG WRITE and sync FLAG WAIT can be implemented in special purpose hardware or, preferably, in software executing on any of the processing nodes 26 of system 5. Still more preferably, the FLAG WRITE and FLAG WAIT elements are embodied as a system software tool operating within the associated processes.

A further appreciation of the structure and operation of the above-described synchronous flag structures mechanisms may be attained by reference to Appendix A, e.g., in the sections entitled "PAS Semaphores and Sync Flags," "pas_flag_write( )," and "pas_flag_wait( )."

Figure 7:
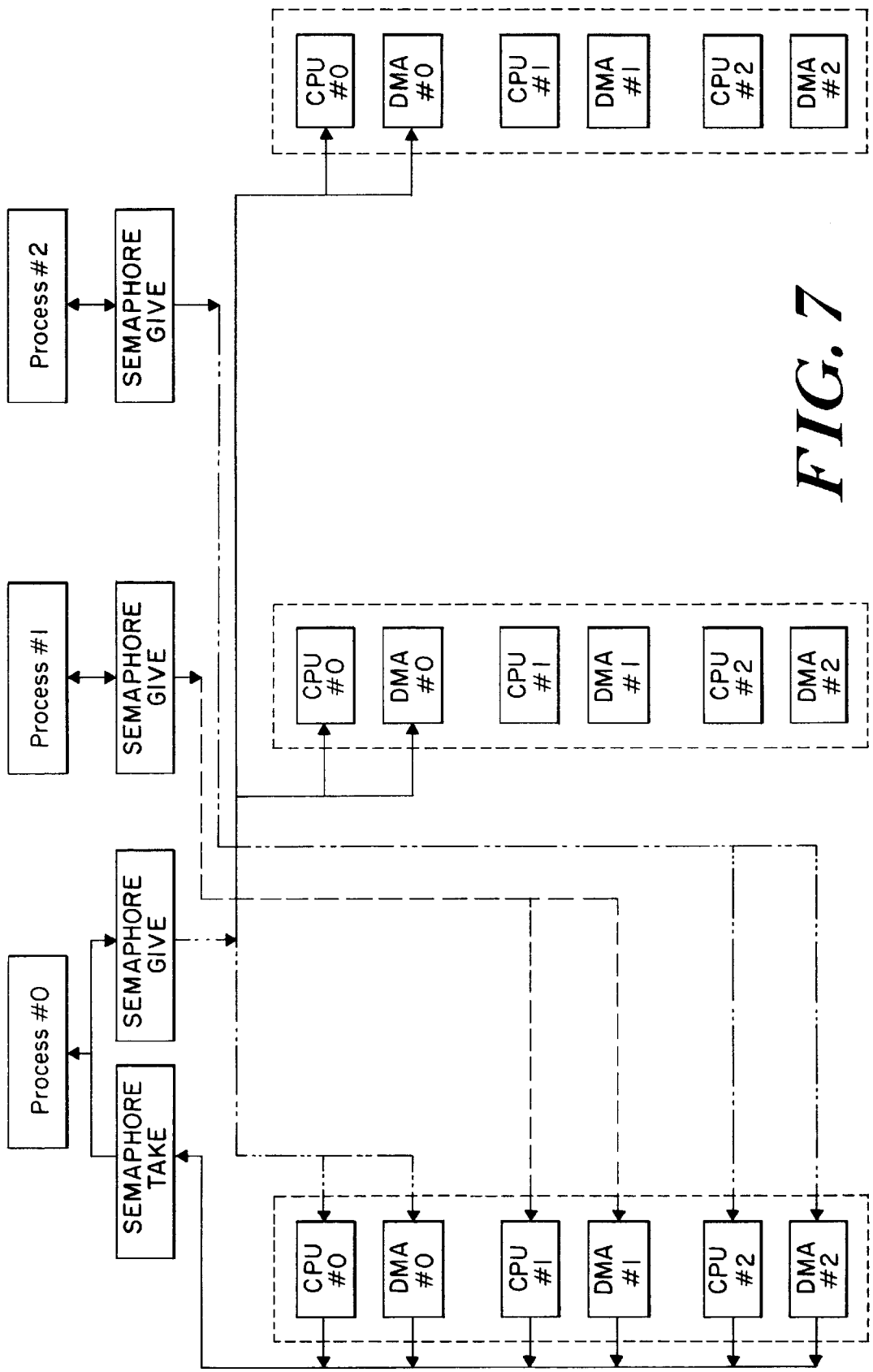

FIG. 7 depicts a multiprocessing system with improved semaphore storage and handling mechanisms according to the invention. These mechanisms are constructed and operated similarly with the synchronization flag storage and handling mechanisms described above.

In contradistinction, however, each process is associated with only two "sets" of semaphore buffers. One set is associated with CPU semaphores from the processes, and the other set is associated with DMA semaphores, as indicated in the drawing. Elements associated with the processes for writing information to their associated semaphore buffers are labeled SEMAPHORE GIVE in the drawings. Elements for monitoring from the associated sets are labeled SEMAPHORE TAKE. As above, although not illustrated for all of the processes, in a preferred embodiment each includes both SEMAPHORE GIVE and SEMAPHORE TAKE elements.

In further contradistinction, the SEMAPHORE GIVE elements simply increment their associated buffers (e.g., by "bumping" a local value representing the current semaphore count and writing it to the shared buffer), indicating that a new semaphore is being signaled. Likewise, the SEMAPHORE TAKE elements simply test the associated buffers in their associated sets to determine whether one or more semaphores are outstanding (e.g., by comparing a local value of the current semaphore count with that in the shared buffer). As above, SEMAPHORE TAKE elements can wait, upon request, until designated semaphores in designated buffers are set.

Every semaphore is, thus, a "triplet" consiting of a shared semaphore buffer, as well as local "shadow" storage counters—one local to the GIVER'er process and one local to the TAKE'er process. It will be appreciated that such use of a triplet mechanims avoids the requirement of having a hardware or software locking.

A further appreciation of the structure and operation of the above-described semaphore structures mechanisms may be attained by reference to Appendix A, e.g., in the sections entitled "PAS Semaphores and Sync Flags," "pas_sem_give( )" and "pas_sem_take( )."

A more complete discussion of the structure and operation of a preferred embodiment of the invention, referred to as "PAS" or "Parallel Application System" may be attained by reference to Appendices A, filed herewith, setting forth a functional specification of the embodiment.

Described above (as supplemented by the appendices which are incorporated herein by reference) are preferred methods and apparatus of the invention meeting the objects set forth above. Those skilled in the art will appreciate that the embodiments described herein and other embodiments incorporating modifications in the spirit hereof fall within scope of invention. Thus, by way of example, it will be appreciated that the invention can be implemented in multiprocessing environments other than those described in copending, commonly assigned U.S. patent application Ser.

No. 213,982, filed Mar. 15, 1994 for Method And Apparatus For Monitoring And Controlling Multiprocessor Digital Data Processing Systems (now U.S. Pat. No. 5,602,729).

In view of the foregoing, what we claim is:

1. In a digital data multiprocessing system of the type having
   a plurality of processes coupled for communication, each having a process identification and an associated memory element for storing information for access at addressable storage locations,
   data access means, coupled to said memory elements, for responding to an applied address signal for accessing a selected datum stored in a corresponding storage location of one of said memory elements,
   the improvement comprising
   A. allocation means for allocating a data buffer having plural portions, each portion comprising one or more addressable storage locations of a memory element of a respective one each of plural ones of said processes, said allocation means including means for generating a pointer referred to hereinafter as "pas_ptr" identifying such data buffer,
   a requesting one of said processes includes means, coupled with said allocation means, for generating a buffer allocation request signal to represent a request for tagged allocation of a buffer distributed among memory elements of a selected plurality of processes, and
   said allocation means responding to a first such request for tagged allocation for allocating a data buffer having a plurality of portions, each comprising one or more addressable storage locations of a memory element of a respective one of said selected plurality of processes, and for generating said pas_ptr signal indicative thereof, and
   said allocation means responding to subsequent such requests for tagged allocation for generating said pas_ptr signal to identify a data buffer allocated in response to the first such request,
   B. mapping means, in communication with said allocation means, for responding to a pas_ptr/proc_id signal, comprising (i) a process identification and (ii) any of a pas_ptr and an offset therefrom, for generating an address signal indicative of a corresponding storage location in the memory element of the process identified by the pas_ptr/proc_id signal, and
   C. at least one of said processes including means, coupled to said mapping means, for generating a pas_ptr/proc_id signal and applying it to the mapping means, and for applying said address signal generated thereby to said data access means for accessing said corresponding storage location.

2. In a system according to claim 2, the further improvement wherein
   said allocation means includes means for allocating said portions of said data buffer to comprise substantially the same number of addressable storage locations within the memory elements of their respective processes.

3. In a system according to claim 2, the improvement comprising
   A. open means for designating a heap region within the memory elements associated with at least selected ones of said processes, said heap region comprising one or more addressable storage locations within each memory element from which said portions of said data buffer are allocated, and
   B. said allocation means includes means for allocating said portions of said data buffer beginning at a common offset within said respective heap regions of said memory elements.

4. In a system according to claim 3, the further improvement wherein
   said allocation means includes means for generating said pas_ptr to represent said common offset.

5. In a system according to claim 3, the further improvement wherein
   A. each said memory element includes storage locations for holding control information regarding its associated heap region and any buffer portions allocated thereto,
   B. said open means includes means for storing at least initial control to those store locations.

6. In a system according to claim 1, the further improvement wherein
   A. a requesting one of said processes includes means for generating said buffer allocation request signal to represent a request for allocation of an assembled buffer, and
   B. said allocation means includes means for responding to such a buffer allocation request signal for allocating a data buffer comprising a single portion.

7. In a system according to claim 1, the further improvement wherein said allocation means includes for allocating multiple data buffers, each having one or more portions comprising one or more addressable storage locations in memory elements of one or more respective sets of processes.

8. In a digital data multiprocessing system of the type having
   a plurality of processes coupled for communication, each process having a process identification and having associated memory element for storing for access information at addressable storage locations therein,
   data access means, coupled to said memory elements, for responding to an applied address signal for accessing data stored in a corresponding storage location in one of the memory elements,
   the improvement comprising
   A. a data buffer having a plurality of portions, each such portion comprising one or more addressable storage locations of a memory element associated with a respective one of each of plural selected process, said data buffer being identified by a pointer referred to herein as "pas_ptr",
   B. a master one of one of said processes includes execution means for generating and transmitting to one or more slave ones of said processes
      (i) a signal, referred to hereinafter as an index signal, indicative of a function/procedure to execute,
      (ii) a signal, referred to hereinafter as an argument signal, comprising a pas_ptr/proc_id signal representative of a selected storage location in the data buffer with which that function/procedure is to be executed, said pas_ptr/proc_id signal comprising (i) the identification of a process and (ii) any of a pas_ptr and an offset therefrom,
   C. said slave processes including mapping means for responding to said pas_ptr/proc_id signal for generating an address signal indicative of a corresponding location in the memory element of the process identified by the pas_ptr/proc_id signal, D. each said slave process further including execution means, coupled to said data access means, for responding to said index signal for executing the function/procedure indicated thereby with respect to the storage location identified by said address signal, and E. said master process and said slave processes including function table means for storing like indexed lists of pointers to one or more function/procedures, said execution means of said master process including means for generating said index signal to represent an index of a selected entry in the function table means of said master process, and said execution means of said slave processes including means for responding to said index signal to identify in the function table means of the respective slave process the function/procedure indexed by that index signal.

9. In a system according to claim 8, the further improvement wherein

A. said master process includes means for generating a signal for notifying said slave processes, B. each said slave process includes means responsive to that signal for invoking said mapping means and said execution means.

10. In a system according to claim 8, the further improvement wherein

A. said master means includes means for generating and transmitting to said slave processes a plurality of argument signals, selected ones of which comprise a pas__ptr/proc__id signal representative of respective storage locations in said data buffer with which said function/procedure is to be executed, B. said master means further includes means for generating and transmitting to said slave processes a signal, referred to herein as a mask signal, indicative of which of those plural argument comprise such pas__ptr/proc__id signals, and C. said mapping means includes means responsive to said mask signal for generating address signals only for those arguments identified by the mask signal as comprising pas__ptr/proc__id signals.

11. In a system according to any of claims 8, 9, or 10, further improvement wherein A. a requesting one of said processes includes means, coupled with said allocation means, for generating said buffer allocation request signal to represent a request for allocation of a buffer distributed among memory elements of a selected plurality of processes, and B. said allocation means includes means for responding to such a buffer allocation request signal for allocating a data buffer having a plurality of portions, each comprising one or more addressable storage locations of a memory element of a respective one of said selected plurality of processes.

12. In a system according to any of claims 8, 9, or 10, the further improvement wherein A. a requesting one of said processes includes means for generating said buffer allocation request signal to represent a request for allocation of an assembled buffer, and B. said allocation means includes means for responding to such a buffer allocation request signal for allocating a data buffer comprising a single portion.

13. A method for executing functions/procedures on a multiprocessing digital data processing apparatus, said method comprising A. invoking, on a master process executing on the multiprocessing system, a master function/procedure with zero, one or more arguments, that master function/procedure corresponding to one or more slave functions/procedures to be invoked on one or more slave processes executing on the multiprocessing system, B. executing said master function/procedure, on said master process, to
  i) generate an index signal identifying a slave function/procedure to be executed by one or more of the slave processes,
  ii) invoke a driver sequence of instructions for transferring for access by those one or more slave processes said index signal and an argument signal indicative of said zero, one or more arguments with which the slave functions/procedures are to be invoked, C. responding, with each of those one or more slave processes, to said index signal and to said argument signal for invoking on the respective slave process the slave function/procedure identified by the index signal with the zero, one or more arguments identified by the argument signal, and D. said master process and said slave processes including function table means for storing like indexed lists of pointers to one or more function/procedures, said executing step including generating said index signal to represent an index of a selected entry in the function table means of said master process, and said responding step including responding, with said slave processes, to said index signal to identify in the function table means of the respective slave process the function/procedure indexed by that index signal.

14. A method according to claim 13, comprising the steps of establishing a data buffer having one or more portions, each such portion comprising one or more addressable storage locations of a memory element associated with a said process, said data buffer being identified by a signal referred to herein as a pas__ptr, generating the argument signal to identify one or more of storage location in the data buffer, said argument representing each of those storage locations in terms of (i) the identification of the associated process and (ii) any of said pas__ptr and an offset therefrom.

15. A method according to claim 14, comprising the step of determining, in connection with invocation of a slave function/procedure, an address corresponding to a storage location identified by the argument signal, invoking that slave function/procedure with that address.

16. A method according to claim 13, wherein step (A) includes the steps of linking an object-code representation of said first sequence of instructions with one or more object-code libraries, identifying as said selected function/procedure a selected function/procedure for which there is an undefined reference following said linking step.

17. A method according to claim 16 comprising the steps of generating a sequence of instructions for constructing a data table having entries for each of one or more selected function/procedure for which there is an undefined reference following said linking step, including in each entry in said table a pointer to a corresponding slave function/procedure.

18. A method according to claim 17, comprising the step of binding said pointer to a corresponding function/procedure with a linker.

19. A method according to claim 13, comprising the steps of
storing, during execution of said driver sequence of instructions, in memory accessible to said one or more slave processes at least one of said index signal and said argument signal,
accessing from memory accessible to each said slave process at least one of said index signal and said argument signal.

20. A method according to claim 19, wherein
step (C) comprises the step of generating, during execution of said driver sequence of instructions, a signal for notifying said one or more slave processes,
step (D) comprises the step of responding, with each of said slave processes, to such notification to commence execution of said corresponding function/procedure.

21. A method for operation digital data multiprocessing system of the type having
a plurality of processes coupled for communication, each having a process identification and an associated memory element for storing information for access at addressable storage locations,
data access means, coupled to said memory elements, for responding to an applied address signal for accessing a selected datum stored in a corresponding storage location of one of said memory elements,
said method comprising
A. generating a buffer allocation request signal to represent a request for tagged allocation of a buffer distributed among memory elements of a selected plurality of processes,
responding to such a request for tagged allocation, allocating a data buffer having plural portions, each portion comprising one or more addressable storage locations of a memory element of a respective one of each of plural ones said processes, AND generating a pointer referred to hereinafter as "pas_ptr" identifying such data buffer,
responding to subsequent such requests for tagged allocation, generating said pas_ptr signal to identify a data buffer allocated in response to the first such request,
B. a mapping step for responding to a pas_ptr/proc_id signal comprising (i) a process identification and (ii) any of an applied pas_ptr and an offset therefrom, for generating an address signal indicative of a corresponding storage location in the memory element of the process identified by the pas_ptr/proc_id signal, and
C. at least one of said processes generating a pas_ptr/proc_id signal and causing the mapping step to be executed with respect thereto, and for applying said address signal to said data access means for accessing said corresponding storage location.

22. A method according to claim 21, comprising
A. generating said buffer allocation request signal to represent a request for allocation of an assembled buffer, and
B. said allocation step includes the step of responding to such a buffer allocation request signal for allocating a data buffer comprising a single portion.

23. A method of operation a digital data multiprocessing system of the type having a plurality of processes coupled for communication, each process having a process identification and having associated memory element for storing for access information at addressable storage locations therein,
data access means, coupled to said memory elements, for responding to an applied address signal for accessing data stored in a corresponding storage location in one of the memory elements,
comprising
A. generating a data buffer having a plurality of portions, each such portion comprising one or more addressable storage locations of a memory element associated with a respective one of each of plural selected process, said data buffer being identified by a pointer referred to herein as a "pas_ptr",
B. generating, with a master one of said processes,
(i) a signal, referred to hereinafter as an index signal, indicative of a function/procedure to execute,
(ii) a signal, referred to hereinafter as an argument signal, comprising a pas_ptr/proc_id signal representative of a selected storage location in the data buffer with which that function/procedure is to be executed, said pas_ptr/proc_id signal comprising (i) the identification of a process and (ii) any of a pas_ptr and an offset therefrom,
C. responding, with one or more slave processes, to said pas_ptr/proc_id signal for generating an address signal indicative of a corresponding storage location in the memory element of the process identified by that that pas_ptr/proc_id signal, and
D. further responding, with said slave processes, to said index signal for executing the function/procedure indicated thereby with respect to the storage location represented by said address signal,
E. said master process and said slave processes including function table means for storing like indexed lists of pointers to one or more function/procedures,
said executing step including generating said index signal to represent an index of a selected entry in the function table means of said master process, and
said responding step including responding, with said slave processes, to said index signal to identify in the function table means of the respective slave process the function/procedure indexed by that index signal.

24. In a system according to claim 1, the improvement comprising
A. process set creation means for creating a process set comprising one or more selected processes, said process set creation means including means for generating a signal referred to hereinafter as "pset_id" identifying such set,
B. one or more requesting processes includes means for generating a process set creation signal.

25. In a system according to claim 24, the improvement comprising
A. said process set creation means includes means responsive to a first such request for generating said process set and for generating said pset_id signal indicative thereof, and
B. said process set creation means including means responsive to subsequent such requests for generating said pset_id signal to identify said process set created in response to said first such request.

26. In a system according to claim 24, the improvement comprising
  A. pas_pset_query means, coupled to said process set creation means, responsive to a pset_id signal for generating a list of one or more process numbers associated with the processes comprising that set,
  B. a requesting one of said processes includes means, coupled to said pas_pset_query means, for applying thereto a pset_id signal and for applying to said mapping means the list generated thereby,
  C. said requesting process further including means applying said address signals generated by said mapping to said data access means for accessing corresponding storage locations in the memory elements associated with the processes comprising that set.

27. In a system according to claim 26, the further improvement comprising
  a requesting one of said processes includes move means, coupled to said pas_pset_query and said mapping means, for responding to
    i) a first pset_id signal associated with an active set of processes,
    ii) a first pas_ptr signal associated with a data buffer on said active set of processes,
    iii) a second pset_id signal associated with a passive set of processes,
    iv) a second pas_ptr signal associated with a data buffer on said passive set of processes,
  for redistributing a data set contained in storage locations in such data buffer on said active set of processes at least of to and from storage locations in such data buffer on said passive set of processes.

* * * * *

UNITED STATES PATENT AND TRADEMARK OFFICE
CERTIFICATE OF CORRECTION

PATENT NO. : 6,243,762 B1
DATED : June 5, 2001
INVENTOR(S) : Greene et al.

It is certified that error appears in the above-identified patent and that said Letters Patent is hereby corrected as shown below:

Column 11,
Line 54, please delete "claim 2"; and insert therefor -- claim 1 --.

Column 15,
Line 15, please delete "wherein"; and insert therefor -- comprising the steps of --.
Line 16, please delete "step (C) comprises the step of".
Line 19, please delete "step (D) comprises the step of".

Column 18,
Line 6, please delete "signal".
Line 10, please delete "signal".

Signed and Sealed this

Fifteenth Day of January, 2002

Attest:

JAMES E. ROGAN
Director of the United States Patent and Trademark Office

Attesting Officer